(12) United States Patent
Ueda

(10) Patent No.: US 7,281,306 B2
(45) Date of Patent: Oct. 16, 2007

(54) MACHINE TOOL

(75) Inventor: Toshio Ueda, Yamatokoriyama (JP)

(73) Assignee: Mori Seiki Co., Ltd., Nara (JP)

( * ) Notice: Subject to any disclaimer, the term of this patent is extended or adjusted under 35 U.S.C. 154(b) by 311 days.

(21) Appl. No.: 11/074,840

(22) Filed: Mar. 9, 2005

(65) Prior Publication Data

US 2005/0198793 A1    Sep. 15, 2005

(30) Foreign Application Priority Data

Mar. 10, 2004  (JP)  ............................ 2004-066816

(51) Int. Cl.
*B23B 5/00* (2006.01)
(52) U.S. Cl. ................. 29/27 C; 29/27 R; 29/33 J; 409/38; 409/165; 409/201; 409/216; 82/158
(58) Field of Classification Search ............. 29/27 C, 29/27 R, 33 J, 56.5; 409/165, 201, 216, 409/19, 38; 82/157, 158
See application file for complete search history.

(56) References Cited

U.S. PATENT DOCUMENTS 7,137,939 B2 * 11/2006 Ueda ........................ 483/27

2005/0022351 A1 * 2/2005 Tokuma et al. ............. 29/27 C
2006/0225261 A1 * 10/2006 Matsumoto et al. ........ 29/27 C
2006/0236514 A1 * 10/2006 Sasazawa et al. .......... 29/27 C

FOREIGN PATENT DOCUMENTS

JP        2003-311502        11/2003

* cited by examiner

*Primary Examiner*—Monica Carter
*Assistant Examiner*—Eric A. Gates
(74) *Attorney, Agent, or Firm*—Westerman, Hattori, Daniels & Adrian, LLP.

(57) ABSTRACT

A machine tool includes a tool spindle head for supporting a first side of a hob via an arbor, a turret, and a tool supporting unit including a movable section and a fixed section. The fixed section is fixedly mounted to the turret and slidably supporting the movable section. The movable section includes a support member for rotatably supporting a second side of the hob. The movable section further includes a first holding member holding the support member rotatably, second holding members holding the first holding member rotatably about an axis which extends perpendicularly to the rotation axis of the support member, and a slide member provided along the second holding members and fitted to a slide guide formed at the fixed section. When the tool supporting unit is positioned at a predetermined tool holding position, the movable section is capable of advancing and retreating in the Y-axis direction.

6 Claims, 8 Drawing Sheets

MACHINE TOOL

BACKGROUND OF THE INVENTION

1. Field of the Invention

The present invention relates to a machine tool provided with a tool spindle head which is pivotable and to which a tool is to be mounted, such as a composite lathe.

2. Description of Related Art

Recently, there has been developed a composite lathe which is capable of performing machining for forming e.g. an oblique hole in addition to milling and drilling operations. Such a composite lathe includes a tool spindle head to which various kinds of tools stored in a tool magazine can be removably mounted by an automatic tool changer (ATC).

Examples of such composite lathe include a double-spindle machining lathe 1 having such a structure as shown in FIG. 9. Specifically, the double-spindle composite lathe 1 includes a first headstock 12 fixedly provided on one side of a bed 11 and a second headstock 13 provided on the other side of the bed 11 movably in the Z-axis direction in facing relationship to the first headstock 12. The composite lathe 1 further includes a saddle 16 provided between the first headstock 12 and the second headstock 13 on the bed 11 movably in the Z-axis direction, a tool rest 15 mounted on the saddle 16 movably in the X-axis direction and supporting a turret 14 for allowing the indexing movement, and a column 17 standing on the rear side of the bed 11 movably in the Z-axis direction on the bed 11. The column 17 has an inclined surface to which a tool spindle head 19 is mounted pivotally in the B-axis direction via a support base 18 which is movable in the X-axis direction.

In the composite lathe 1, by pivoting the tool spindle head 19 in the B-axis direction, a tool spindle can be so set as to makes an arbitrary angle with respect to the main spindle. Therefore, by mounting a hob as a gear cutting tool to the tool spindle head 19, a workpiece set to the first headstock 12 and the second headstock 13 can be subjected to gear cutting as well as the machining to form an oblique hole. Therefore, the composite lathe is advantageous in that it is unnecessary to subject a workpiece to pre-machining such as cutting and then perform gear cutting by setting the workpiece to a hobbing machine designed for gear cutting only.

During the gear cutting by using the composite lathe 1, the hob is held by the tool spindle head 19 only at one side thereof. However, such gear cutting performed while holding the hob only at one side thereof is likely to warp the hob, because the cutting resistance of the hob relative to the workpiece is high. Further, due to vibration and change of cutting resistance during the machining, it is difficult to achieve sufficient workpiece machining accuracy.

To solve such problems, the applicant of the present invention has proposed a composite lathe, which is disclosed in Japan Patent Laid-Open Publication No. 2003-311502 and illustrated in FIGS. 10 and 11 of the present specification. As shown in the figure, the lathe includes a tail-stock type tool supporting unit 50 mounted to a turret 14. The tool supporting unit 50 includes a main portion 52 supported by a rest 51 pivotally in the B-axis direction and provided with a tailstock spindle 53 which is capable of advancing and retreating due to hydraulic pressure. One side of a hob H, which is an example of tool which can be supported at opposite sides thereof, is mounted to a tool spindle head 19, and the other side of the hob H is pivotally supported by the tailstock spindle 53 of the main portion 52. It is to be noted that the reference sign W in FIGS. 10 and 11 indicates a workpiece.

However, in the above tool supporting unit 50, the main portion 52 including the tailstock spindle 53 for supporting the hob H merely pivots in the B-axis direction. Therefore, to perform gear cutting with respect to workpieces of different diameters, the tool supporting unit 50 needs to be changed in accordance with the diameter of each workpiece. Further, even in performing gear cutting with respect to workpieces of the same diameter, the mounting position of the tool supporting unit 50 needs to be adjusted in accordance with the amount of wear when the hob H is worn, which causes a deterioration in working efficiency.

SUMMARY OF THE INVENTION

It is, therefore, an object of the present invention to provide a machine tool which is capable of reliably and properly supporting opposite sides of a tool without being influenced by the change of the workpiece diameter and the wear of the tool.

According to a first aspect of the present invention, there is provided a machine tool comprising a headstock for holding a workpiece, a pivotable tool spindle head for holding a tool, and a turret for holding a tool the turret is provided with a tool supporting unit including a support member when a tool of a type capable of being held at a first side and a second side which are opposite from each other is mounted to the tool spindle head at the first side, the support member is capable of rotatably supporting the second side when the tool supporting unit is indexed to a predetermined tool holding position, the support member is movable to advance and retreat in a direction in which a pivot axis of the tool spindle head extends and is pivotable in a same direction as the tool spindle head.

In a preferred embodiment, the machine tool may further include a supporter for supporting the support member in the direction in which the pivot axis of the tool spindle head extends.

In a preferred embodiment, in releasing the tool from the support member of the tool supporting unit, condition of the support member is maintained.

In a preferred embodiment, the support of the tool by the support member and the release of the tool from the support member are performed with the support member pivoted to a predetermined position.

As noted above, in the machine tool according to the first aspect of the present invention, when the tool supporting unit is indexed to a predetermined tool holding position, the support member is movable to advance and retreat in the direction in which the pivot axis of the tool spindle head extends. Therefore, even when the diameter of the workpiece to be machined changes or the tool held at opposite sides is worn, such a situation can be easily addressed just by advancing or retreating the tool spindle head and the support member in the direction in which the pivot axis of the tool spindle head extends without the need for replacing the tool supporting unit with another one or adjusting the mounting position of the tool supporting unit.

In the machine tool having the above-described structure, with the first side of the tool mounted to the tool spindle head while the second side of the tool supported by the support member, the support member is advanced or retreated, via the tool, in the direction in which the pivot axis of the tool spindle head extends by advancing or retreating the tool spindle head in the direction. However, when the pivot axis of the tool spindle head is inclined, the weight of the movable section including the support member is exerted onto the tool (or an arbor) when the tool is moved up and down along the pivot axis. In such a case, the tool (arbor) may be warped, which may hinder the accurate positioning of the tool.

However, as noted above, when the machine tool further includes a supporter for supporting the support member in the direction in which the pivot axis of the spindle head extends, the full weight of the movable section including the support member is not exerted onto the tool (or an arbor). Therefore, the warping of the tool (or an arbor) can be suppressed to a minimum, and accurate positioning of the tool is possible.

Moreover, in the case where the condition of the support member is maintained in releasing the tool from the support member as noted above, the position of the tool spindle head in releasing the tool from the support member can be stored in an NC system, for example. In such a case, the support of the tool at the next time can be performed by moving the tool spindle head, to which the tool is mounted, to the position stored in the NC system after the tool supporting unit is indexed to a tool holding position. Therefore, the support and release of the tool can be automated.

Further, in the case where the support of the tool by the support member and the release of the tool from the support member are performed with the support member pivoted to a predetermined position, the support member can be held at the predetermined position by a simple supporting mechanism.

The foregoing and other objects, features and effects of the present invention will become more apparent from the following description of the preferred embodiments with reference to the attached drawings.

DESCRIPTION OF THE PREFERRED EMBODIMENTS

Figure 9:
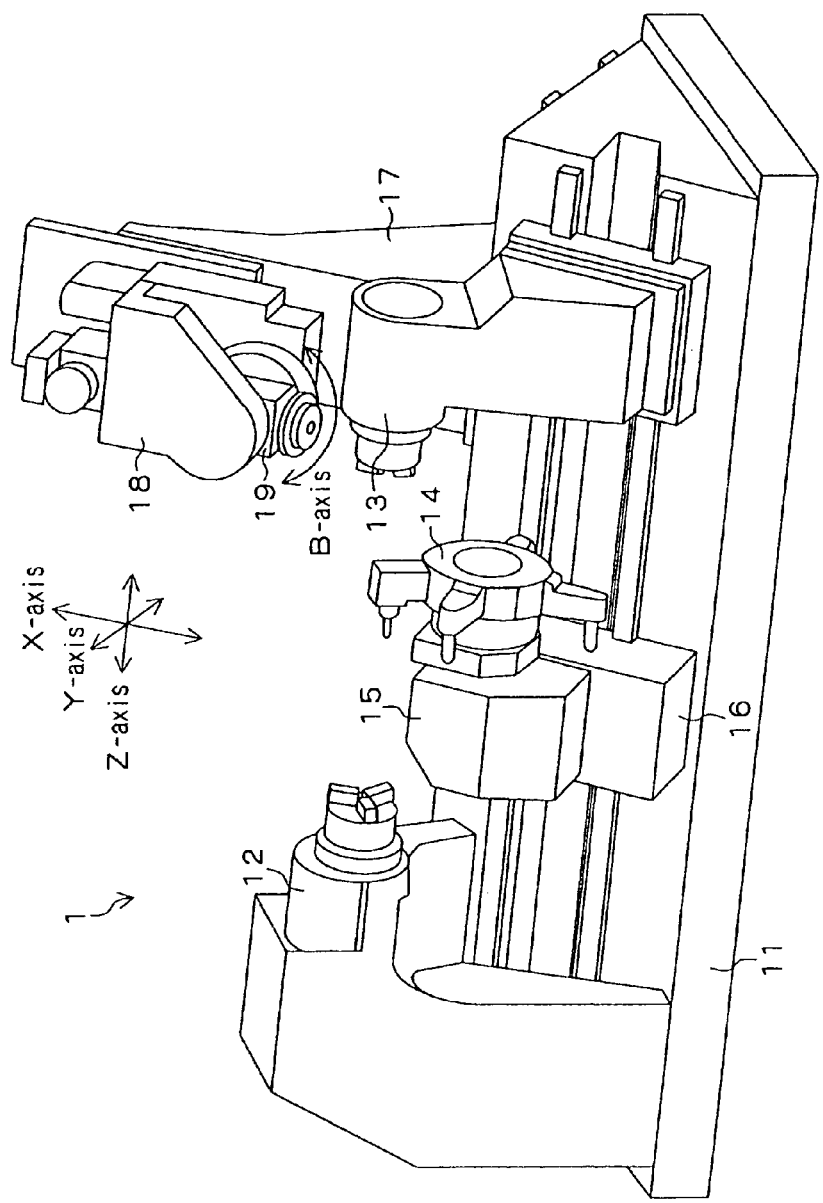
FIG. 9 is a perspective view showing the basic structure of a prior-art composite lathe including a tool supporting unit.
Figure 10:
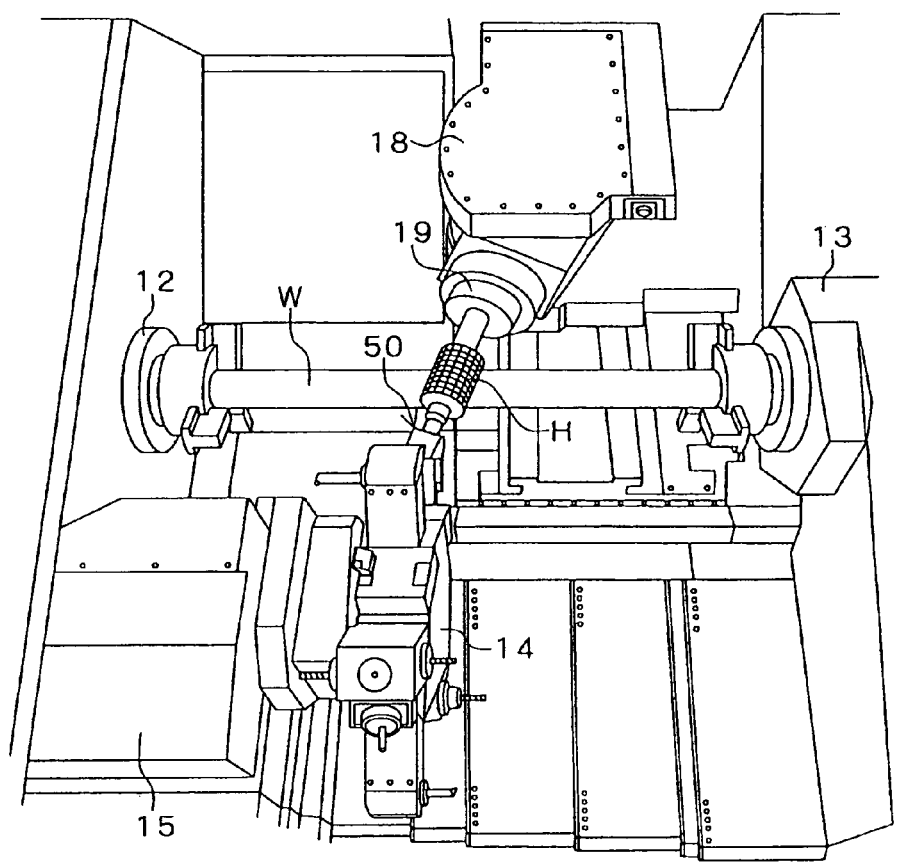
FIG. 10 is a partially-enlarged perspective view showing the gear cutting of a workpiece by using the prior-art composite lathe.
Figure 11:
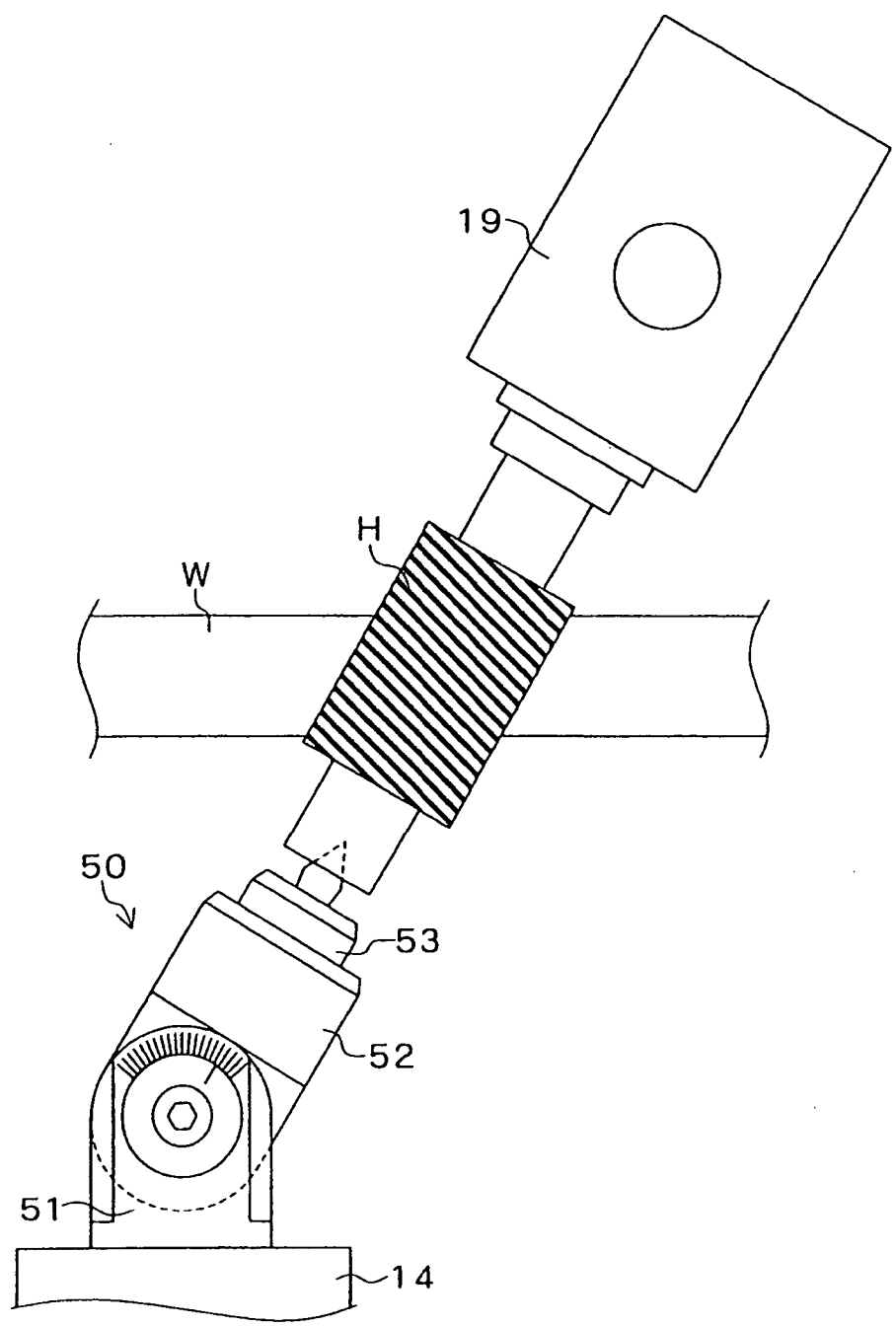
FIG. 11 is a schematic front view showing the state in which opposite sides of the hob H are supported by the tool spindle head and the tool supporting unit of the prior art composite lathe.

Preferred embodiments of the present invention will be described below with reference to the accompanying drawings. Instead of the tool supporting unit 50 of the prior-art composite lathe 1 shown in FIGS. 9 and 10, the machine tool of this embodiment includes a tool supporting unit 20 as the characteristic portion of the present invention. Since other elements are identical or similar to those of the prior-art composite lathe 1, such elements are indicated by the same reference signs as those used for the composite lathe 1, and detailed description thereof is omitted. Hereinafter, the tool supporting unit 20 as the different structural element will be described in detail.

Figure 1:
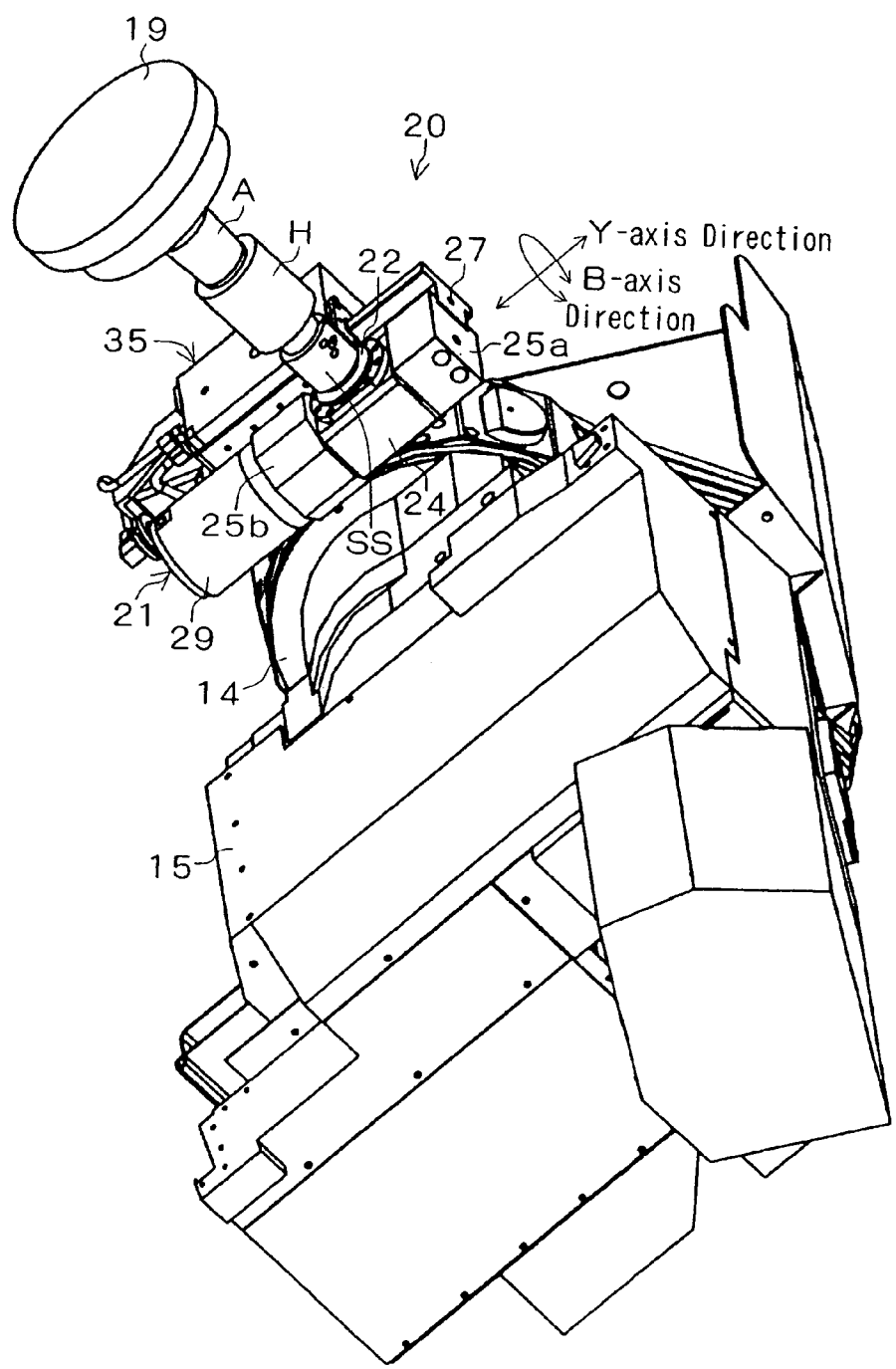
FIG. 1 is a perspective view showing a tool supporting unit of a composite lathe as an embodiment of machine tool according to the present invention.
Figure 2:
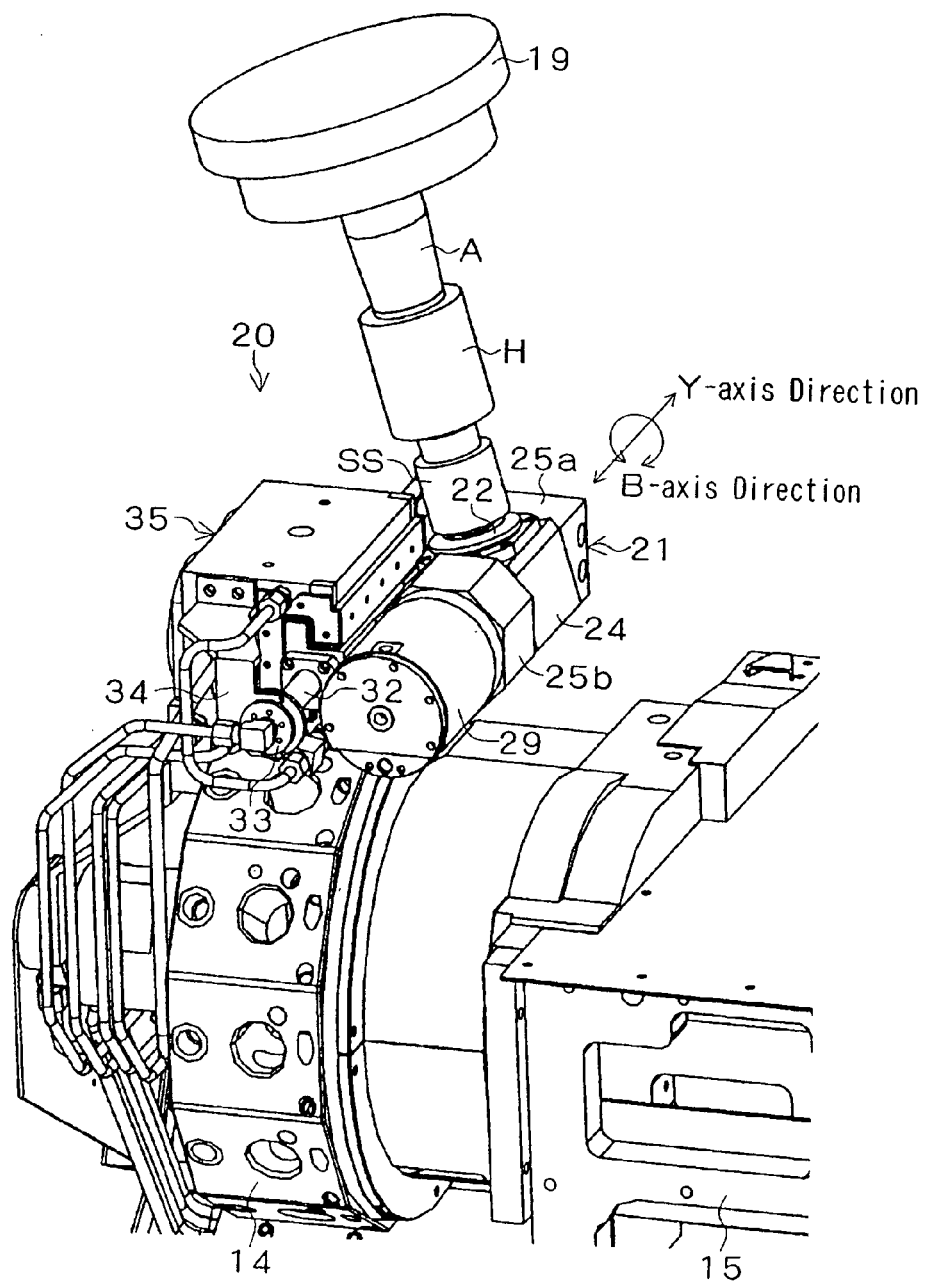
FIG. 2 is a perspective view of the tool supporting unit as viewed from a different direction.

As shown in FIGS. 1 and 2, the tool supporting unit 20 includes a movable section 21, and a fixed section 35 fixedly mounted to a turret 14 and supporting the movable section 21 slidably. The movable section 21 includes a support member 22 for rotatably supporting a hob H which is mounted to a tool spindle head 19 via an arbor A. Specifically, a first side of the hob H (first side of the arbor A) is supported by the tool spindle head 19, whereas a second side of the hob H (second side of the arbor A) which is opposite from the first side is supported by the support member 22. When the tool supporting unit 20 is indexed to a tool holding position, the movable section 21 is movable to advance and retreat along the Y-axis, which is the pivot axis of the tool spindle head 19.

As shown in FIGS. 3-6, the movable section 21 further includes a first holding member 24 holding, via a bearing 23, the support member 22 rotatably, second holding members 25a and 25b holding, via bearings 26a and 26b, the first holding member 24 rotatably about an axis extending perpendicularly to the rotation axis of the support member 22, and a slide member 27 provided along the second holding members 25a, 25b and fitted to a slide guide 36 formed at the fixed section 35. The support member 22 includes a projection 22a for fitting to a support sleeve SS attached to the second side of the arbor A. The support member 22 further includes an air supply path 22b formed along the rotation axis thereof, and an air supply path 22c which is formed in the projection 22a for communication with the air supply path 22b and opens at the circumferential surface of the projection 22a. When the projection 22a is fitted to the support sleeve SS attached to the second side of the arbor A, the air supply path 22c is closed by the support sleeve SS.

An inner tubular member 28 having a relatively small wall thickness except at opposite ends thereof is fitted around the first holding member 24 on the side of the second holding member 25b. An outer tubular member 29 having a relatively large wall thickness is fitted around the inner tubular member 28 so that a predetermined gap s is defined between the thin-walled portion of the inner tubular member 28 and the outer tubular member 29. Each of the inner tubular member 28 and the outer tubular member 29 is connected to the second holding member 25b.

Figure 3:
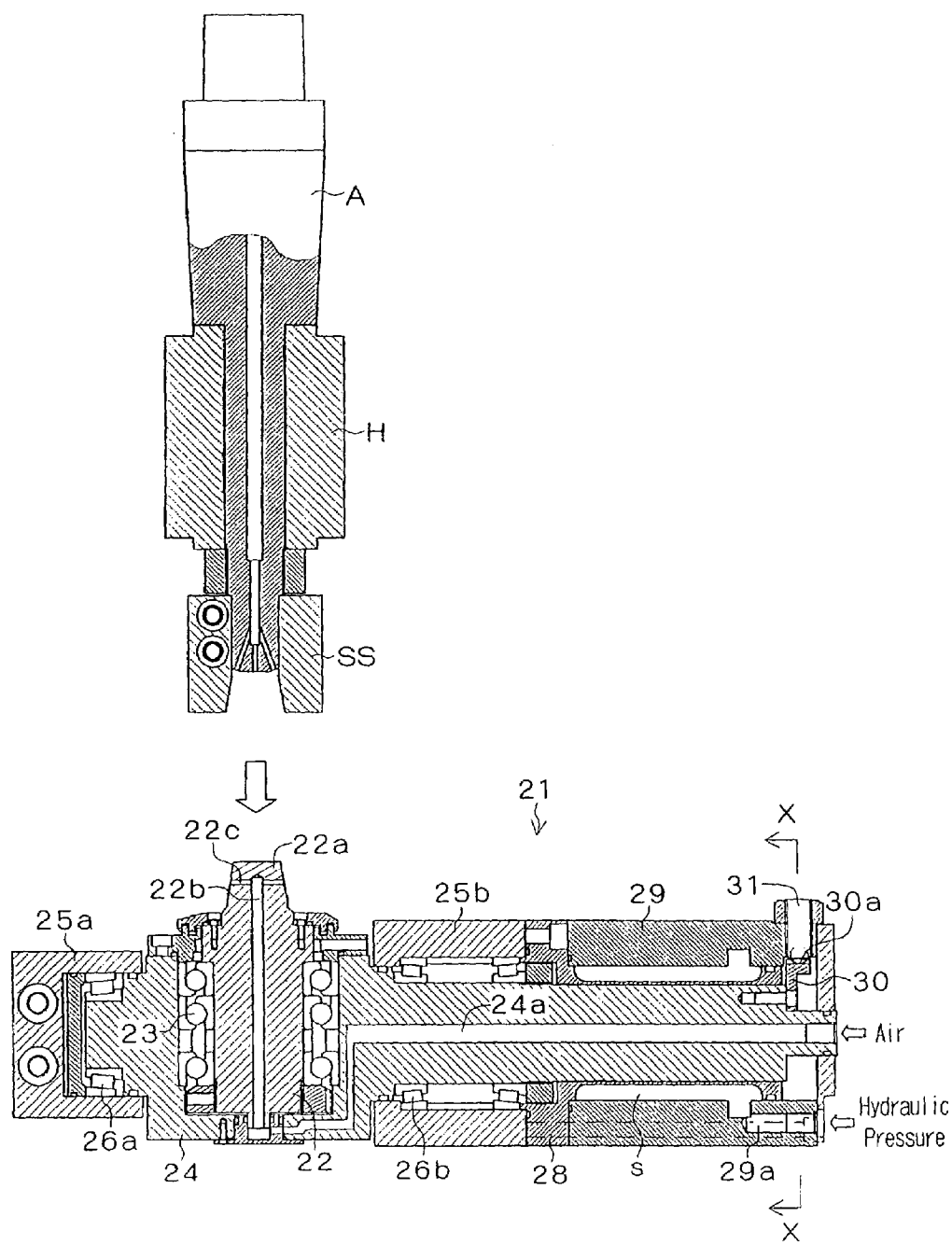
FIG. 3 is a sectional view showing the movable section of the tool supporting unit.
Figure 4:
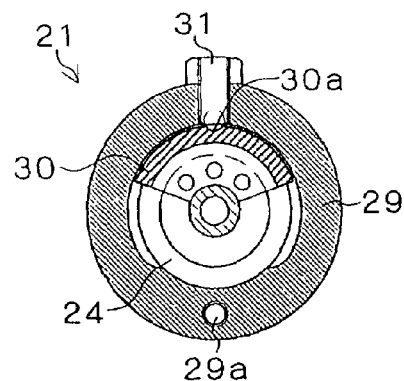
FIG. 4 is a sectional view taken along lines X-X in FIG. 3.

As shown in FIGS. 3 and 4, a ball plunger 31 is mounted to the outer tubular member 29. By fitting the ball of the ball plunger 31 into a recess 30a formed in a sector-shaped positioning member 30 fixed to an end surface of the first holding member 24 on the side of the second holding member 25b, the first holding member 24 is held at a predetermined rotational position (the position at which the central axis of the support member 22 is oriented in the X-axis direction in the state in which the tool supporting unit 20 is indexed to a tool holding position).

Further, as shown in FIG. 3, the outer tubular member 29 is formed with a hydraulic supply path 29a communicating with the gap s defined between the outer tubular member 29 and the inner tubular member 28. When hydraulic pressure is supplied to the gap s through the hydraulic supply path 29a, the thin-walled portion of the inner tubular member 28 is deformed to press the outer circumferential surface of the first holding member 24. Therefore, the first holding member 24 can be held at an arbitrary rotational position by the frictional force between the first holding member 24 and the inner tubular member 28.

The first holding member 24 is formed with an air supply path 24a connected to the air supply path 22b of the support member 22. The pressure in the air supply paths 22b, 22c and 24a when pressurized air is supplied to the air supply path 24a with the hob H supported by the support member 22, i.e., with the air supply path 22c closed by the support sleeve SS is higher than that when pressurized air is supplied to the air supply path 24a in the state in which the hob H is not supported by the support member 22, i.e., the air supply path 22c is not closed by the support sleeve SS. Therefore, by detecting this pressure change, whether or not the hob H is supported by the support member 22 can be determined.

Figure 6:
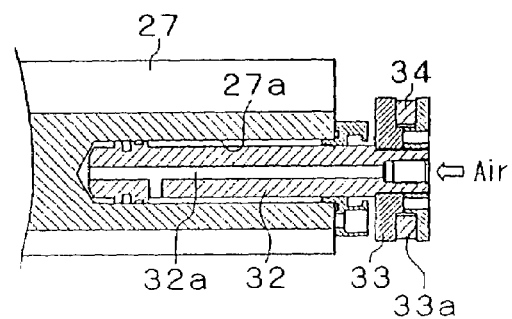
FIG. 6 is a sectional view showing the counterbalance cylinder portion of the tool supporting unit.

As shown in FIGS. 2 and 6, the slide member 27 is provided, at an end on the side of the second holding member 25b, with a counterbalance cylinder portion. The counterbalance cylinder portion includes a hole 27a into which a piston 32 can be inserted for advancing and retreating movement. At an end of the piston 32 is attached an engagement member 33 formed with a circumferential groove 33a. By fitting a support piece 34 attached to the fixed section 35 into the circumferential groove 33a of the engagement member 33, the piston 32 is held at a predetermined position relative to the fixed section 35.

The piston 32 is formed with an air supply path 32a. The supply pressure of pressurized air to the air supply path 32a is so controlled that the interior of the air supply path 32a is constantly maintained at a predetermined pressure (corresponding to 60 to 70% of the weight of the movable section 21, in this instance) Therefore, as shown in FIG. 1, even when the sliding direction of the movable section 21 corresponds to the inclined Y-axis direction by indexing the tool supporting unit 20 to a tool holding position, the movable section 21 is constantly supported by the counterbalance cylinder portion. Therefore, in moving the movable section 21 upward by moving the tool spindle head 19 in the Y-axis direction, the full weight of the movable section 21 is not exerted onto the arbor A and the tool spindle head 19.

Figure 5:
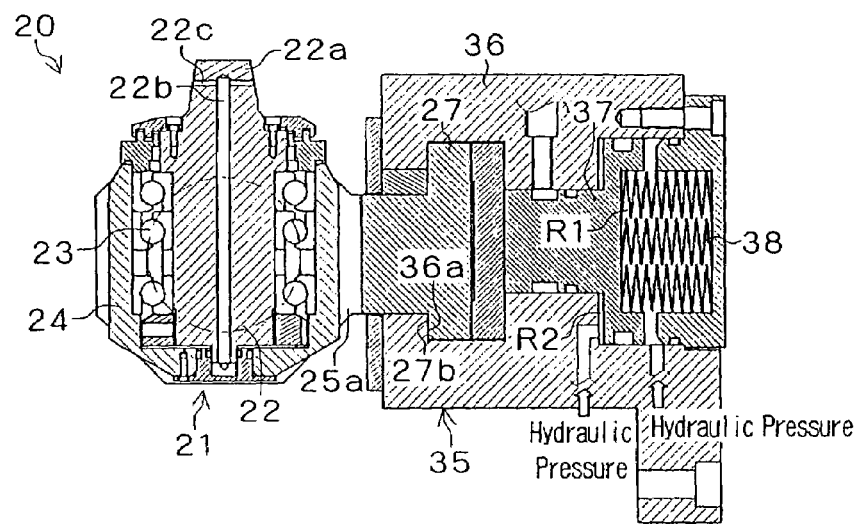
FIG. 5 is a sectional view showing the tool supporting unit.

As shown in FIG. 5, the fixed section 35 includes a hydraulic cylinder portion for holding the movable section 21 at an arbitrary position relative to the fixed section 35. The hydraulic cylinder portion includes a piston 37, and a first cylinder chamber R1 and a second cylinder chamber R2 partitioned by a larger-diameter portion of the piston 37. Thus, hydraulic pressure can be supplied to each of the cylinder chambers R1 and R2. When hydraulic pressure is supplied to the first cylinder chamber R1, the piston 37 pushes the slide member 27 fitted to the slide guide 36, whereby a sliding surface 27b of the slide member 27 is pressed against a sliding surface 36a of the slide guide 36. Therefore, the movement of the slide member 27 (movable section 21) is prevented by the frictional force between the sliding surfaces 27b and 36a. On the other hand, when hydraulic pressure is supplied to the second cylinder chamber R2, the pushing of the slide member 27 by the piston 37 is released, which makes the slide member 27 (movable section 21) freely movable.

In the first cylinder chamber R1 is provided a coil spring 38 for constantly biasing the piston 37 in the direction for causing the sliding surface 27b of the slide member 27 to be pressed against the sliding surface 36a of the slide guide 36. Therefore, even when the supply of hydraulic pressure to the first cylinder chamber R1 is stopped by turning off the power switch, the sliding surface 27b of the slide member 27 is pressed against the sliding surface 36a of the slide guide 36 by the biasing force of the coil spring 38, whereby the movement of the movable section 21 is prevented.

Figure 7A:
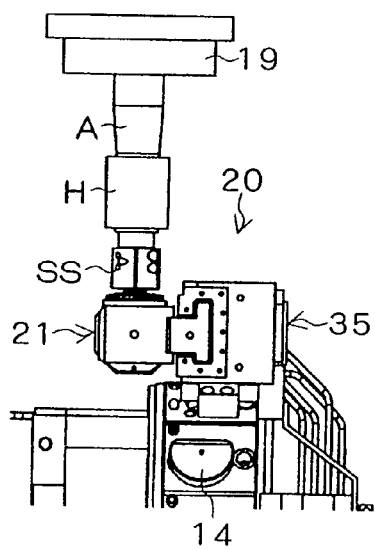
FIGS. 7A and 7B show the operation of the tool supporting unit to support the hob.

For holding the hob H by utilizing the tool supporting unit 20 having the above-described structure, the first side of the hob H (the first side of the arbor H) is mounted to the tool spindle head 19 by an automatic tool changer (ATC). Then, as shown in FIG. 7(A), after the tool supporting unit 20 is indexed to a tool holding position, the ball of the ball plunger 31 is fitted into the recess 30a of the positioning member 30, whereby the first holding member 24 is so positioned that the projection 22a of the support member 22 is oriented in the X-axis direction. In this state, the tool spindle head 19 is moved to fit the support sleeve SS, which is attached to the second side of the arbor A, to the projection 22a of the support member 22. Thus, the second side of the hob H (second side of the arbor A) is supported by the support member 22.

Figure 7B:
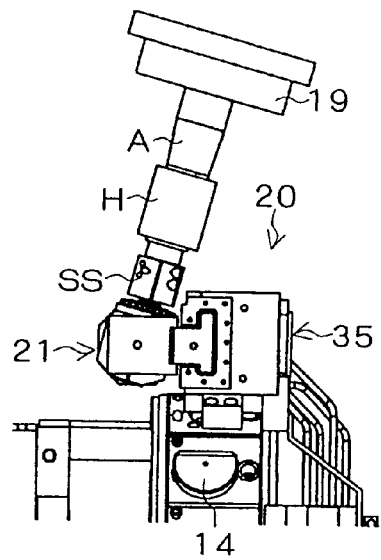
Figure 8A:
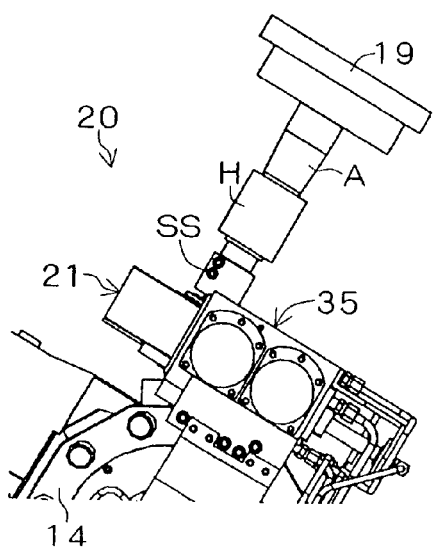
FIGS. 8A and 8B show the operation of the tool supporting unit to support the hob.
Figure 8B:
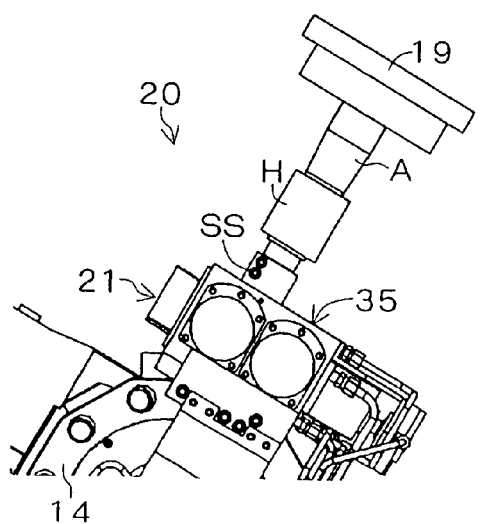

Subsequently, as shown in FIG. 7(B), the hob H is inclined to a predetermined angle by moving the tool spindle head 19 in the X-axis and Z-axis directions and pivoting in the B-axis direction. Further, as shown in FIGS. 8(A) and 8(B), the tool spindle head 19 is moved in the Y-axis direction in accordance with the diameter of the workpiece. In this way, the hob H is moved to the machining starting point. Thereafter, hydraulic pressure is supplied to the gap s through the hydraulic supply path 29a of the outer tubular member 29 to prevent the first holding member 24 from moving in the B-axis direction, while hydraulic pressure is supplied to the first cylinder chamber R1 of the fixed section 35 to prevent the movable section 21 from moving in the Y-axis direction. In this state, machining of the workpiece is started.

After the machining of the workpiece is completed, the movement of the first holding member 24 in the B-axis direction and the movement of the movable section 21 in the Y-axis direction are allowed. Thereafter, by moving the tool spindle head 19 in the X-axis and Z-axis directions while pivoting in the B-axis direction, the position of the first holding member 24 in the B-axis direction is set so that the projection 22a of the support member 22 is oriented in the X-axis direction, and the first holding member 24 is moved to an arbitrary position along the Y-axis direction. Thereafter, with the movement of the movable section 21 in the Y-axis direction prevented again, the tool spindle head 19 is moved in the X-direction, whereby the hob H is removed from the support member 22.

In this way, the removal of the hob H from the support member 22 is performed with the first holding member 24 positioned in the B-axis direction and with the movement of the movable section 21 in the Y-axis direction prevented. Therefore, by storing information on the position of the tool spindle head 19 immediately before the hob H is removed from the support member 22, the support of the hob H by the tool supporting unit 20 at the next time can be automatically performed by moving the tool spindle head 19 to the stored position after the tool supporting unit 20 is indexed to a tool holding position.

As described above, in the composite lathe of this embodiment, after the tool supporting unit 20 is indexed to a predetermined tool holding position, the movable section 21 provided with the support member 22 for supporting the second side of the hob H can be advanced and retreated in the Y-axis direction in which the pivot axis of the tool spindle head 19 extends. Therefore, even when the diameter of the workpiece to be machined changes or the hob H is worn, such a situation can be easily addressed just by advancing or retreating the tool spindle head 19 and the movable section 21 in the Y-axis direction without the need for replacing the tool supporting unit with another one or adjusting the mounting position of the tool supporting unit.

As noted above, in the composite lathe, with the support member 22 of the tool supporting unit 20 holding the hob H mounted to the tool spindle head 19, the support member 22 is advanced or retreated in the Y-axis direction via the hob H (arbor A) by advancing or retreating the tool spindle head 19 in the Y-axis direction. The tool supporting unit 20 is provided with the counterbalance cylinder portion for supporting, in the Y-axis direction, the movable section 21 including the support member 22 for supporting the hob H via the arbor H. Therefore, in moving the hob H in the Y-axis direction, the full weight of the movable section 21 is not exerted onto the arbor A. Accordingly, the arbor A needs to support only 30 to 40% of the full weight of the movable section 21, and the warping of the arbor A can be suppressed to a minimum. Therefore, accurate positioning of the hob H is possible.

In the above-described embodiment, the attachment and detachment of the hob H relative to the support member 22 is performed with the first holding member 24 so positioned that the projection 22a of the support member 22 is oriented in the X-axis direction by fitting the ball of the ball plunger 31 into the recess 30a of the positioning member 30. However, the present invention is not limited thereto, and the attachment and detachment of the hob H relative to the support member 22 maybe performed with the projection 22a of the support member 22 oriented in an arbitrary direction, as long as the pivotal movement of the first holding member 24 in the B-axis direction can be prevented.

Further, in the above-described embodiment, the attachment and detachment of the hob H relative to the support member 22 is performed after the movable section 21 constituting the tool supporting unit 20 is moved to an arbitrary position along the Y-axis direction. However, the present invention is not limited thereto, and the attachment and detachment of the hob H relative to the support member 22 may be performed after the movable section 21 is moved to a predetermined particular position along the Y-axis direction.

Although gear cutting of a workpiece using the hob H is described in the above embodiment, the present invention is applicable to the use of various kinds of tools which can be held at opposite sides thereof. For example, the present invention is applicable to the use of tools such as a plain (cylindrical) milling cutter, a groove milling cutter (side cutter), a metal slitting saw (slitting milling cutter), an angle milling cutter, a thread milling cutter, a form milling cutter, a gang cutter and an involute gear cutter.

Moreover, although a double-spindle type composite lathe is described in the above-described embodiment, the machine tool of this invention is not limited to such a double-spindle type lathe. The present invention can be applied to various kinds of machine tools provided with a pivotable tool spindle head and a turret. However, since a workpiece can be held at opposite sides thereof in such a double-spindle-type composite lathe as described above, not only the tool but also the workpiece can be prevented from warping, whereby the machining accuracy can be further enhanced.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A machine tool comprising: a headstock for holding a workpiece; a pivotable tool spindle head for holding a tool; and a turret for holding a tool; wherein the turret is provided with a tool supporting unit including a support member; wherein, when a tool of a type capable of being held at a first side and a second side which are opposite from each other along a longitudinal axis of the tool is mounted to the tool spindle head at the first side, the support member is capable of rotatably supporting the second side; and wherein, when the tool supporting unit is indexed to a predetermined tool holding position, the support member is movable to advance and retreat in a direction in which a pivot axis of the tool spindle head extends and is pivotable in a same direction as the tool spindle head.

2. The machine tool according to claim 1, further comprising a supporter for supporting the support member in the direction in which the pivot axis of the tool spindle head extends.

3. The machine tool according to claim 2, wherein, in releasing the tool from the support member of the tool supporting unit, condition of the support member is maintained.

4. The machine tool according to claim 3, wherein the support of the tool by the support member and the release of the tool from the support member are performed with the support member pivoted to a predetermined position.

5. The machine tool according to claim 1, wherein, in releasing the tool from the support member of the tool supporting unit, condition of the support member is maintained.

6. The machine tool according to claim 5, wherein the support of the tool by the support member and the release of the tool from the support member are performed with the support member pivoted to a predetermined position.

* * * * *